Dec. 17, 1946.          R. W. SMITH          2,412,637
CAPSULE FILLING DEVICE
Filed April 8, 1941          7 Sheets-Sheet 1

INVENTOR.
Ralph W. Smith
BY
Barnes, Kisselle, Laughlin & Raisch
Attorneys.

Dec. 17, 1946.  R. W. SMITH  2,412,637
CAPSULE FILLING DEVICE
Filed April 8, 1941  7 Sheets-Sheet 6

INVENTOR.
Ralph W. Smith
BY Barnes, Kisselle, Laughlin & Raisch
Attorneys.

Patented Dec. 17, 1946

2,412,637

UNITED STATES PATENT OFFICE 2,412,637

CAPSULE FILLING DEVICE

Ralph W. Smith, Detroit, Mich., assignor to Flint Machinery Company, Flint, Mich., a corporation of Michigan Application April 8, 1941, Serial No. 387,473

7 Claims. (Cl. 226—41)

This invention relates to a means for handling capsules and more particularly to a means for decapping, filling, recapping and ejecting gelatin capsules of the separable type.

The object of this invention is to provide a device which will automatically select capsules from a hopper, remove the capsule caps and fill the capsule bodies with a desired material, replace the caps upon the capsule bodies and eject the filled capsules. The invention is adapted to perform these functions with a speed never heretofore obtained and obviates the necessity of manual labor performing any of these steps. One of the features contributing to the high speed is the concurrent performance of the various functions upon different capsules and the performance of each of the individual functions concurrently upon a plurality of capsules. Other objects and advantages will be apparent from the following description and claims.

Figure 1:
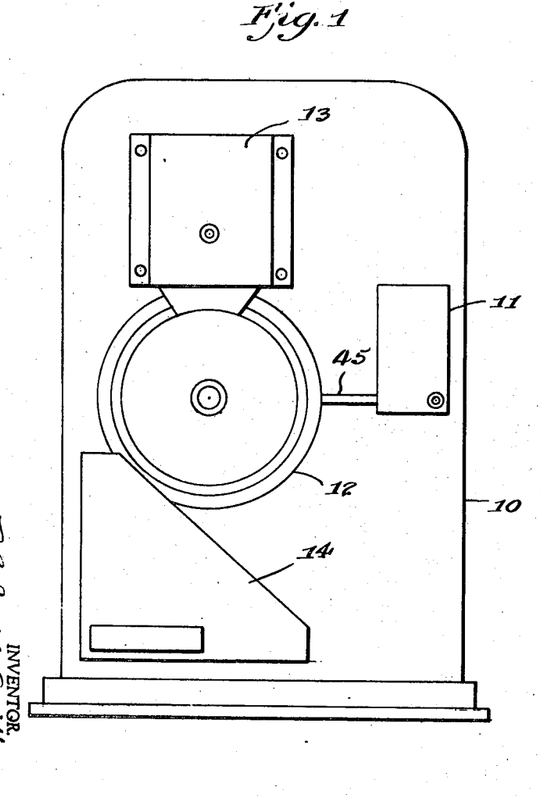
Fig. 1 is a front view of an assembled machine.
Figure 4:
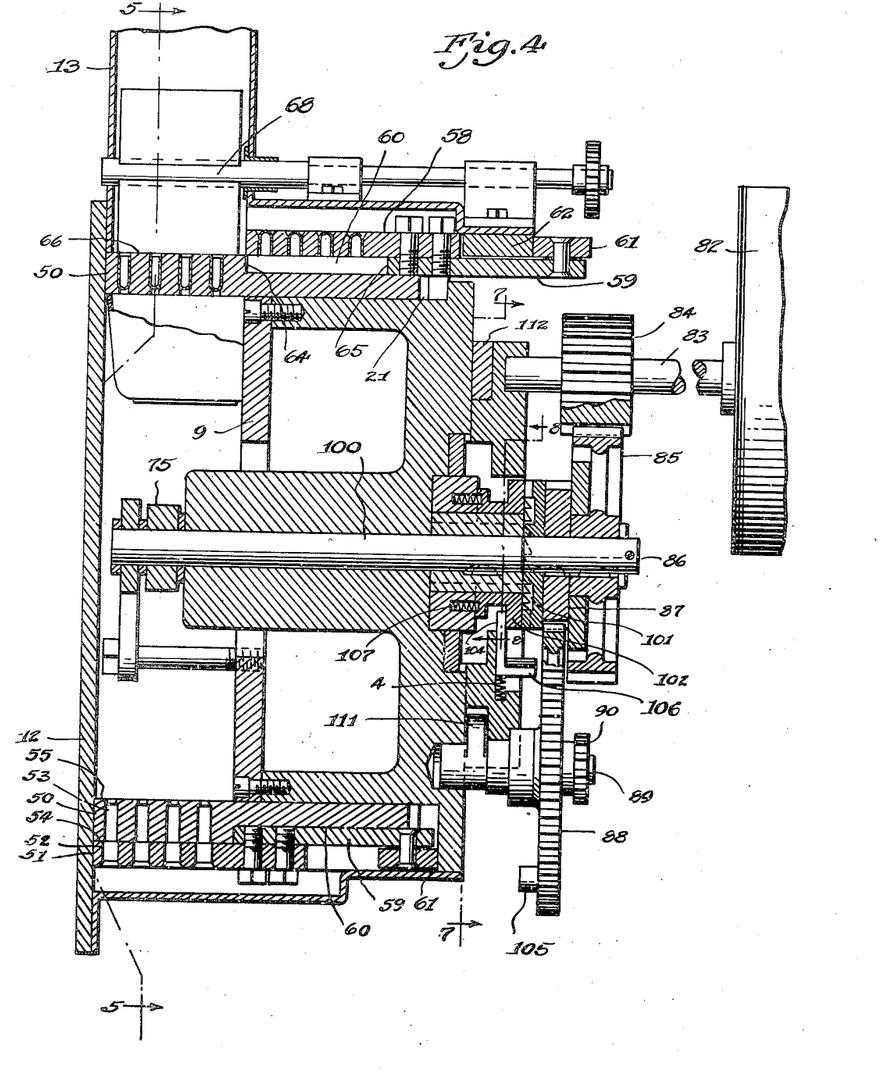
Fig. 4 is a section on the line 4—4 of Fig. 3.

The device has been substantially enclosed within a cabinet 10 for obvious reasons. Referring to Fig. 1 the general arrangement of parts will be described. A capsule hopper 11 is provided at the side of a rotatable drum 12 which is mounted on frame member 9 (Fig. 4). The capsule elements will be retained in drum 12 while some of the operations are performed on them. A hopper 13 for medicine or other material to fill the capsules is preferably positioned above the drum. A suitable receptacle 14 to receive the finished capsules is positioned below a portion of the drum. During the operation of the machine capsules will be taken from hopper 11 filled with medicine from hopper 13 and deposited in receptacle 14. For simplicity the various parts of the device will be described in conformity with their sequence of operation upon an individual capsule.

The device is adapted to operate upon groups of capsules which pass through the individual steps or operations as a unit. The number of capsules in these groups is limited only by mechanical problems of design. The device illustrated is adapted to operate upon groups containing four capsules each (see Fig. 4). It is to be understood that the device may be constructed to operate upon groups containing any number of capsules. A group of four has been chosen merely for the purpose of description.

The first operations to be performed upon individual capsules are to meter them from the capsule hopper 11 and position them so that they are ready to be transported to the drum 12. Referring to Figs. 15 through 26 a device adapted to perform these operations will be described. The hopper 11 contains a quantity of empty capsules which are promiscuously arranged. Shaft 15 is rotatably mounted through the hopper 11 and power driven by means to be described herein. Five agitators 16 provided with irregular peripheries are keyed to shaft 15 to agitate the capsules and segregate them into four divisions. A plurality of fingers 17 which project between agitators 16 and are fastened to a shaft 18 are periodically reciprocated through actuation of arm 19 by lugs 20 on the side of a gear 21 keyed to shaft 15. The fingers 17 prevent the capsules from crowding together. The capsules fall into four vertical chutes 22. A plunger 23 projects laterally across each chute and a slide 24 is adapted to be extended across each chute at approximately the length of a capsule below plungers 23. The plungers 23 and plate 24 are alternately reciprocated and withdrawn from the chutes whereby one capsule is metered through each chute at predetermined intervals. When plunger 23 is retracted a capsule may fall to the position of capsule 25 in Fig. 16 where it is retained until plunger 23 is returned to block the chute and the plate 24 is subsequently retracted to allow the capsule 25 to fall. Plate 24 then returns to block the chute and plungers 23 are retracted to allow another group of capsules to fall down to plate 24. The combination of chutes 22, plate 24 and plungers 23 has been referred to herein as the metering means.

A cam 26 keyed to shaft 15 and provided with tooth 27 engages a bell crank 28 pivotally mounted at 29 on the hopper 11 to actuate plate 24. A spring 30 returns plate 24 and bell crank 28 to their Fig. 16 positions. Plate 31 engages plungers 23 and is pivotally mounted at 29. A lever 7 fastened to plate 31 is adapted to be engaged by lug 33 on cam 26 to actuate plungers 23. Springs 34 return the plungers 23 and plate 31 to their Fig. 16 position.

Figure 18:
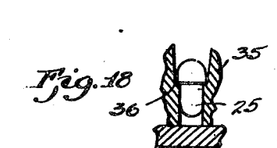
Figs. 18 through 21 show the operation of the capsule righting means upon a capsule which falls from the hopper with the cap end uppermost.
Figure 22:
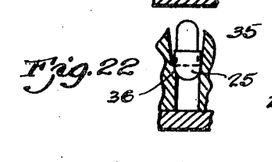

Five vertical plates 35 are provided below the chutes 22. The plates 35 have the upper portion of their upright surfaces tapered away from the cooperating plate and a small ledge 36 is formed at the intersection of the inclined and vertical surfaces. The distance between the vertical surfaces of adjacent plates is greater than the diameter of a capsule body but less than the diameter of the capsule cap. Referring to Figs. 18 and 22 it will be seen that if the capsule falls body end down out of chute 22, the body will pass down between the vertical walls and the cap will be retained upon the ledge 36, but if the capsule falls cap end down the cap will be stopped by ledge 36 and the capsule balanced with its body up in the air. Pins 8 may be pivotally suspended between plates 35 to prevent the capsule from falling over.

Figures 19, 20, 21, 23, 24, 25, 26:
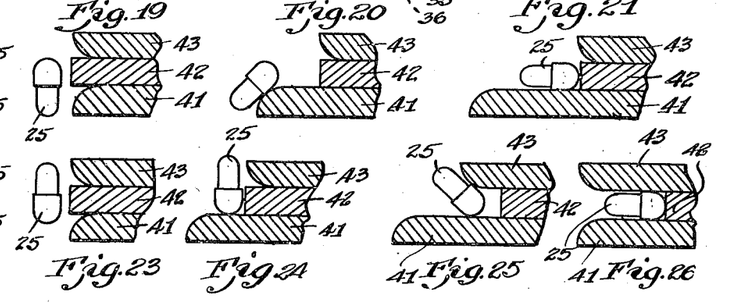
Figs. 22 through 26 show the operation of the capsule righting means upon a capsule which falls from the hopper with the body end up.

It is necessary to position all capsules in a substantially horizontal position with the capsule body pointing toward the drum 12. Means are provided to cooperate with the plates 35 to so position the capsules. A pinion gear 37 keyed to shaft 38 is driven by gear 21. A bevel gear 39 is keyed on shaft 38 and engages a bevel gear 40 on a vertical shaft 44. Vertical shaft 44 is provided with three cam surfaces 6 each adapted to engage a horizontally slidable plate 41, 42 or 43 (see Figs. 16 and 19). Each plate 41, 42 and 43 is provided with four fingers 5 adapted to pass between plates 35. Each plate 41, 42 and 43 has suitable spring means to return it to its normal position to the right in Fig. 16 after it has been actuated by the cam 6. The lower plate 41 is first actuated by its cam 6 and is extended between plates 35. Of the four capsules retained between plates 35 those which are in the position shown in Fig. 18 will be pivoted by the plate 41 as shown in Figs. 19, 20 and 21 to the desired position. Of the four capsules those retained with the body extending upwardly as shown in Fig. 22 will be unaffected by plate 41. Plate 43 is next cammed forward and will pivot the capsules in the position shown in Fig. 25. Pins 8 are freely movable and will not interfere with this operation. Plate 42 is then actuated and all four capsules, which are now in similar positions with the body pointing toward the drum, are moved into their respective channels 46 in the housing 45.

Figures 5, 6:
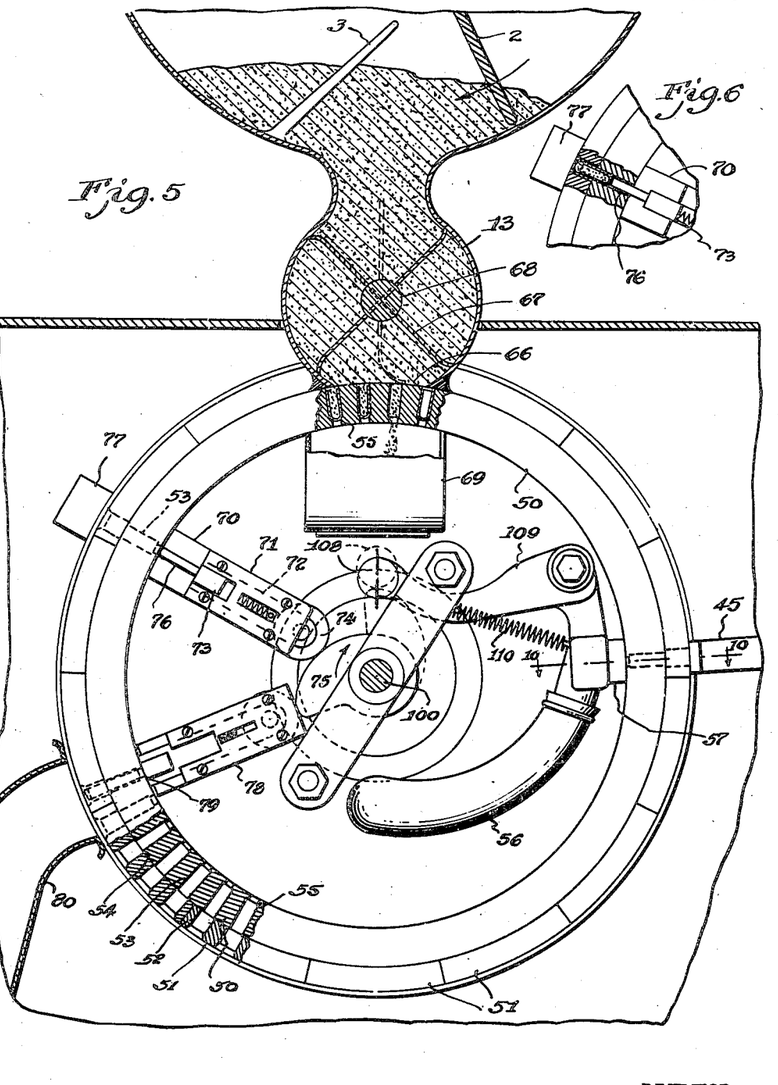
Fig. 5 is a view on the line 5—5 of Fig. 4.
Fig. 6 is a partial view of Fig. 5 showing a capsule being recapped.
Figures 11, 12, 13, 14:
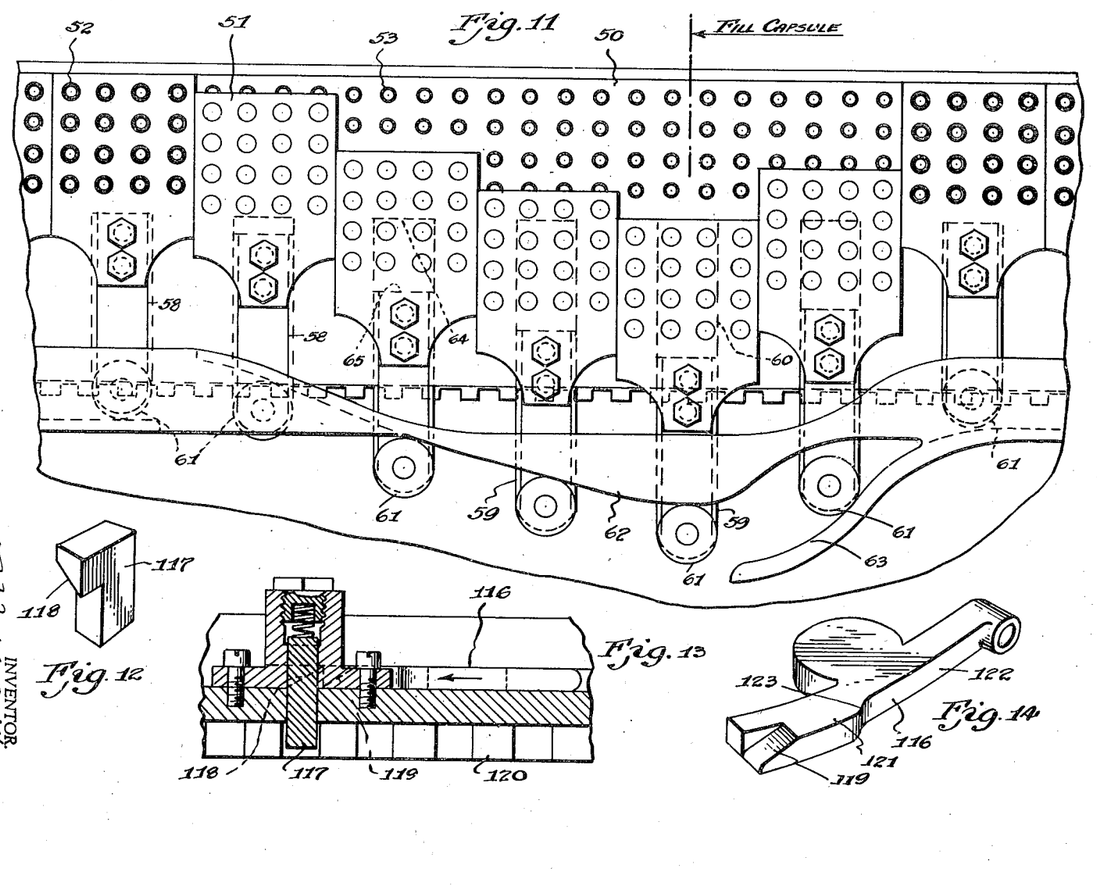
Fig. 11 is a projected view of a portion of the drum and capsule cap carriers.
Fig. 12 is a perspective view of the locking dog.
Fig. 13 is a sectional view of part of the indexing means.
Fig. 14 is a perspective view of the locking cam.
Figures 15, 17:
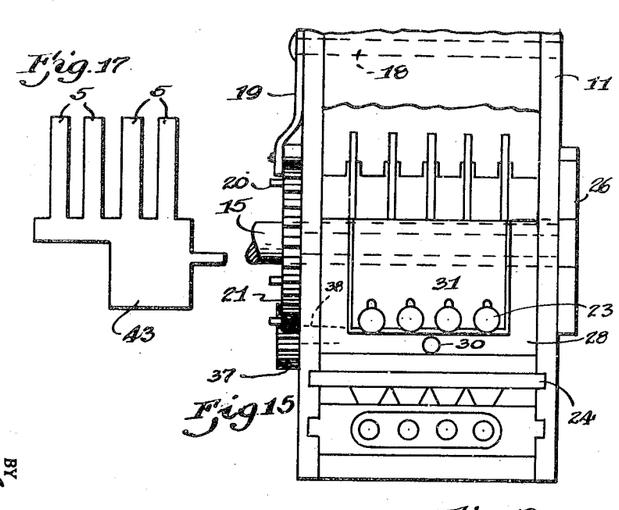
Fig. 15 is a front view of the capsule hopper and its feeding and righting means.
Fig. 17 is a plan view of one plate in the capsule righting means.

Referring to Figs. 4, 5 and 11 it will be seen that the drum 12 comprises a cylindrical capsule body carrier 50 and a plurality of arcuate capsule cap carriers 51 slidably mounted around the exterior surface of the capsule body carrier 50.

The capsule cap carriers are adapted to be moved axially of the capsule body carrier by means to be described herein. The capsule body carrier and capsule cap carriers are provided with longitudinal rows of radial cylindrical holes adapted to register when the capsule cap carriers are in their outermost position (to the left in Figs. 4 and 11). The holes 52 in the capsule cap carriers 51 are large enough to receive the capsule cap. The holes 53 in the capsule body carrier 50 have a diameter large enough to receive the capsule body but not large enough to receive the capsule cap. A shoulder 54 is formed by the capsule body carrier 50 when the holes are in alignment. A suitable shoulder 55 is formed near the bottom of holes 53.

The housing 45 is sealed and air tight. The channels 46, each of which receive a capsule from hopper 11, have a diameter slightly larger than a capsule cap. A conduit 56 (see Fig. 5) extends to a suitable vacuum pump, and is provided with a rubber cup portion 57 adapted to surround one axial row of holes 53 from the inside of capsule body carrier 50. A suction is produced in holes 52 and 53 and channels 46 of housing 45. The capsules are drawn into the holes in drum 12 by this suction. It has been found that to obtain a satisfactory decapping of the capsules when the housing 45 is substantially horizontal that it is necessary to have the housing 45 of considerable length. Lengths greater than six inches have given satisfactory results. This length is necessary to give the capsules distance in which to build up a very high speed and momentum. When the capsule cap is abruptly stopped by shoulder 54 the inertia of the capsule body carries it on into holes 53 and the cap and body are thereby separated. It is to be understood that suction alone has been found unsatisfactory to decap the capsules and the suction in conduit 56 need not be strong enough to decap a stationary capsule positioned with the cap against shoulder 54. The inertia of the capsule body is critical. For this reason housing 45 and conduits 46 must be of sufficient length. Other means than suction could be used to impart high velocity to the capsules.

When one row of capsules (four capsules per row illustrated in the drawings) is decapped, the conduit 56 is moved out of contact with the interior surface of the capsule body carrier and the entire drum 12 including capsule body carrier 53 and capsule cap carriers 51 is rotated sufficiently to bring the next row of holes in line with channels 46 and the decapping operation is repeated on another group of capsules which have been deposited from hopper 11 into channels 46.

The drum 12 is intermittently rotated to bring succeeding rows of holes in line with channels 46. This is called indexing and the means of accomplishing it will be described herein. Referring to Figs. 4 and 11 it will be seen that as the drum 12 is indexed the capsule cap carriers 51 are moved axially of the capsule body carrier 50. Each capsule cap carrier is provided with an arm 58 extending axially of the drum 12. Arms 58 are provided with a dovetail portion 59 adapted to slidably engage a dovetail recess 60 in capsule body carrier 50. The end of each arm has a roller 61 pivotally mounted thereon. Rollers 61 engage cam tracks 62 and 63 which slide the capsule cap carriers 51 to the right and left respectively in Fig. 11. Cam track 62 is adapted to have each capsule cap carrier 51 fully retracted when it is under the hopper 13 (see Fig. 4). Cam track 63 engages and cam track 62 releases rollers 61 under hopper 13 and capsule cap carriers 51 are moved to the left in Figs. 4 and 11 as the drum 12 is indexed by subsequent operation. The capsule cap carriers 51 extend around the entire surface of the capsule body carrier 50 so that at any instant some cap carriers are being retracted and some advanced. A shoulder 64 on capsule body carrier 50 engages a shoulder 65 on dovetail 59 to assure proper alignment of the holes 52 and 53 when the capsule cap carriers are cammed back to initial position.

The retracting of capsule cap carriers 51 permits each row of holes 53 containing a capsule body to be indexed beneath hopper 13 containing medicine or other material with which the capsules are to be filled. Referring to Figs. 4 and 5 it will be seen that hopper 13 has an opening 66 abutting the outer surface of the capsule body carrier 50. Suitable stirring mechanism shown as rotatable fingers 2 and fixed fingers 3 may be provided to prevent the material in the hopper from packing and will assure a flow of material. A plurality of flexible blades 67 keyed to rotatable shaft 68 wipe across the surface of capsule body carrier 50 and fill the capsule bodies with medicine. As shown in Fig. 4 the group of four capsules are presented beneath opening 66 simultaneously. The wiping action of blades 67 and the shoulder 55 on which the capsule bodies abut assure that each capsule body will be completely filled with an amount of medicine equal to that placed in other capsule bodies. If desired, the shaft 68 may be rotated at variable speeds by suitable selective gearing. Varying the speed of rotation of shaft 68 will vary the degree of packing of the medicine or other material in the capsules. A stationary cup 69 may be provided within and below the upper portion of capsule body carrier 50 to receive any medicine received through a hole 53 if for any reason no capsule body is present in hole 53. The cup 69 will prevent waste of valuable material and prevent the material from falling on the moving parts of the machine. If the medicine or other material forced into hole 53 contains moisture or is not sufficiently powdery to fall into cup 69 it will be packed in hole 53 and ejected as a slug by the ejecting means to be described herein.

As the drum 12 is indexed the filled capsules which have passed under hopper 13 are rotated to a recapping means 70 (see Fig. 5). The capsule cap carriers 51 are moved back over the capsule body carrier 50 by cam 63 until the caps are aligned with their respective filled capsule bodies. Shoulders 64 and 65 assure this alignment. Recapping means 70 comprises a stationary housing 71 having a dovetail keyway 72 extending radially of drum 12 and a slide 73 movably mounted in said keyway. Slide 73 is provided with a roller 74 adapted to be actuated by a cam 75 to be described herein. Slide 73 is provided with a plurality of fingers 76 adapted to be extended into holes 53 in the capsule body carrier and force the capsule bodies radially outward. A stationary stop member 77 is positioned to hold the capsule caps in their holes 52 at this point. The plungers 76 therefore force a group of capsule bodies (four capsules in the drawings) into their respective caps at each actuation. A suitable spring may be used to return slide 73 to its initial position after the recapping operation is performed. Fig. 6 shows the capsule being recapped.

As the drum 12 is indexed a group of capsules is presented to an ejecting means 78. The ejecting means 78 is very similar to recapping means 70 except that stop member 77 is not included and the plungers 79 which penetrate holes 53 are longer than plungers 76. As the ejecting means 78 is actuated by cam 75 the plungers 79 push the capped capsule out of holes 53 and 52. The ejected capsule falls into a trough 80 where they fall by gravity into receptacle 14.

It is to be understood that the operations described above are occurring concurrently on different groups of capsules and at any one instant some capsules are being metered and another group of capsules is being decapped while still other groups of capsules are being filled, recapped and ejected. Each group having any one operation performed on it contains a plurality of capsules. The drawings show groups of four but the invention is not limited to that number.

Figure 2:
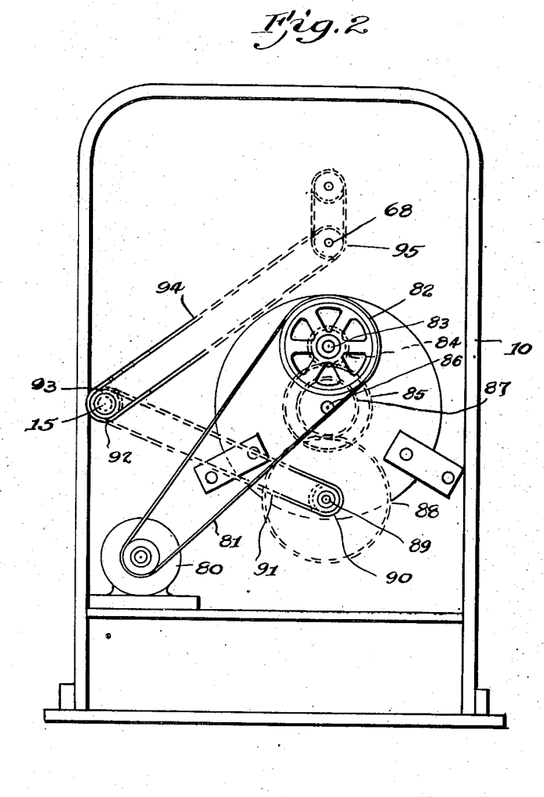
Fig. 2 is a rear view of the machine of Fig. 1 with the back of the cabinet removed to expose the driving means.
Figure 3:
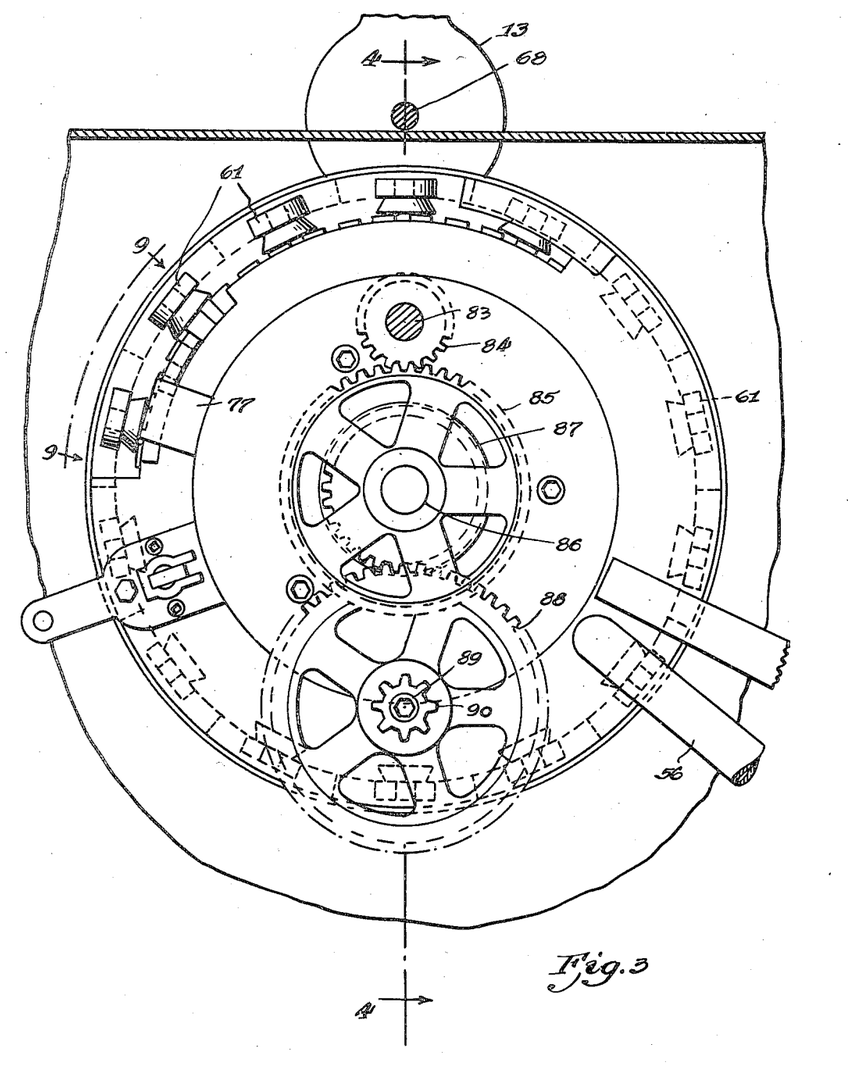
Fig. 3 is a rear view of the drum and some of its associated parts.

It is necessary to provide a drive means for the various moving parts and an indexing means for drum 12. It is further necessary to provide a timing mechanism that will actuate the suction cup 57, recapping means, and ejector during the interval of time when the drum 12 is stationary between indexing movements. Referring to Fig. 2 a suitable source of power, shown as an electric motor 80, is provided. A belt 81 driven by motor 80 rotates pulley wheel 82 rotatably mounted on shaft 83 in stationary housing 10. Pinion gear 84 keyed to shaft 83 engages gear 85 to a shaft 86. A pinion gear 87 keyed to shaft 86 engages gear 88 mounted on shaft 89. Sprocket 90 on shaft 89 drives chain 91 and sprocket 92 on the shaft 15 of the metering and indexing means shown in Figs. 15 through 26. A second sprocket 93 on shaft 15 drives chain 94 and sprocket 95 on the shaft 68 of the medicine hopper 13. These gears and chains operate continuously with the motor 80.

Figures 7, 8, 9, 10:
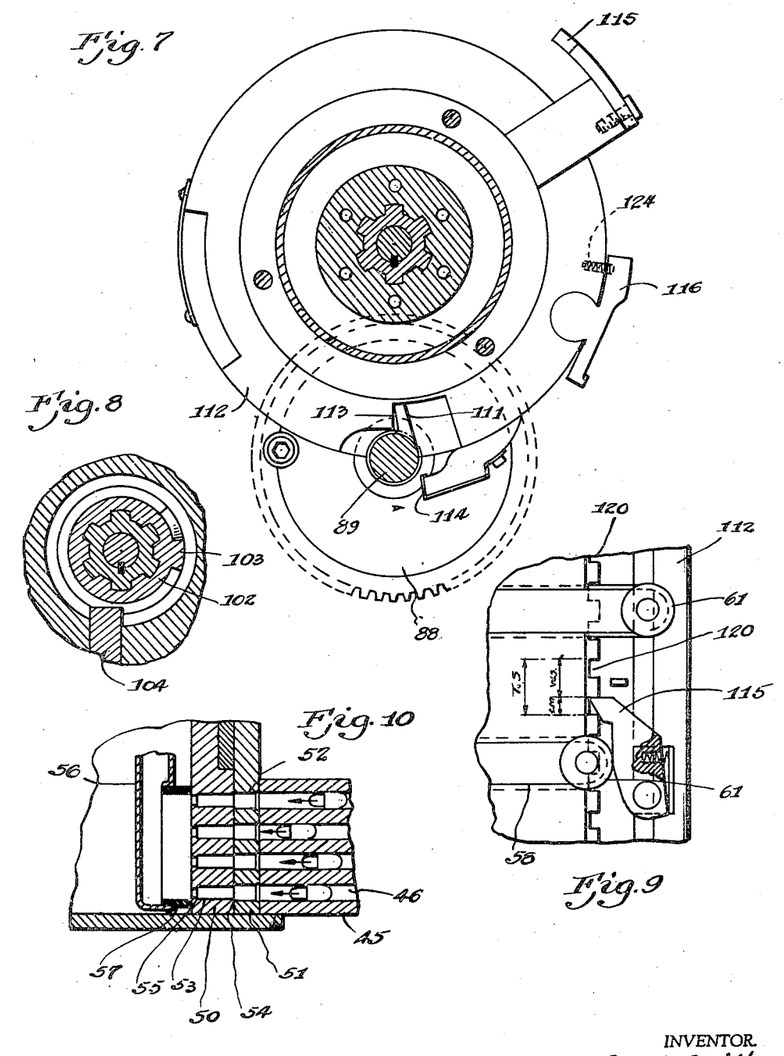
Fig. 7 is a section on the line 7—7 of Fig. 4.
Fig. 8 is a section on the line 8—8 of Fig. 4.
Fig. 9 is a view on the line 9—9 of Fig. 3.
Fig. 10 is a view on the line 10—10 of Fig. 5.

Referring to Fig. 4 main drive pulley 82 rotates pinion 84 which engages pinion 85 keyed to rotatable shaft 86. Rotation of shaft 86 will intermittently through a clutching means rotate shaft 100 which operates cam 75 that actuates the suction means, ejector, and capping means. Ratchet wheel 101 on shaft 86 will periodically drive ratchet wheel 102 on shaft 100. Referring to Figure 8 ratchet wheel 102 is shown to have a lug 103 which will be blocked by dog 104 and prevent rotation of ratchet wheel 102. When this occurs ratchet wheel 101 may rotate out of engagement with ratchet 102 due to the inclined surfaces on the engaging teeth of the ratchets. Lug 105 provided on the side of gear 88 will once during a revolution of gear 88 engage projection 106 on dog 104 and disengage the latter from lug 103 and ratchet wheel 102. Dog 104 is normally urged into engagement with lug 103 by spring 4. When dog 104 is retracted by lug 105 ratchet wheel 102 is positively driven by ratchet wheel 101, and shaft 100 and cam 75 are rotated one complete revolution until lug 103 again engages dog 104 (see Fig. 8), dog 104 having been projected again by spring 6. Springs 107 resiliently urge ratchet wheel 102 into engagement with ratchet 101. It will thus be seen that shaft 86 rotates continuously while shaft 100 periodically rotates one revolution and stops. Referring to Fig. 5 the dotted line position of cam 75 is shown in engagement with wheel 108 of the bell crank 109 carrying the suction conduit 56 and rubber cup 57 to hold the rubber cup away from the capsule body carrier 50. This is the dwell position of cam 75 while the dog 104 is preventing rotation of shaft 100. When shaft 100 is rotated one revolution as hereinabove described the cam 75 releases bell crank 109 permitting compression spring 110 to force suction cup 57 against the capsule carrier. The rotation of cam 75 actuates the ejector and recapping means and again engages wheel 108 to remove the suction cup 57 from the capsule body carrier. Cam 75 remains in this position until it is actuated again. While cam 75 is stationary and in engagement with wheel 108 the indexing of drum 12 occurs.

During the interval of time when shaft 100 and cam 75 are stationary and not rotating due to the disengagement of ratchet 101 and 102 the indexing of drum 12 is performed. This moves a new row of holes 52 and 53 in front of the suction means, hopper 13, recapping means, and ejector 78. Dog 111 on shaft 89 (see Figs. 4 and 7) oscillates a ring 112 which is rotatably mounted on stationary housing 10 at the rear of drum 12. Ring 112 is oscillated by alternate engagement of dog 111 with surfaces 113 and 114 as shaft 89 is rotated (see Fig. 7). A side view of ring 112 and the rear portion of the side of drum 12 is shown in Fig. 9. A dog 115 is pivotally mounted on ring 112. The dog 115 is adapted to engage teeth 120 in the periphery of the drum 12. As ring 112 is reciprocated and moved forward by the rotation of dog 111, the dog 115 will be carried forward and index the drum through a distance labelled W. S. (working stroke). On the return of ring 112 dog 115 will ride freely back through a distance labelled T. S. (total stroke). There is a lost motion labelled L. M.

The drum 12 is locked in position and temporarily released long enough for the dog 115 to index it. The locking means is shown in Figs. 12 and 14. Pivotally mounted cam member 116 is mounted on the periphery of ring 112 (see Fig. 7). A perspective view of the cam member 116 is shown in Fig. 14. A side view of it is shown in Fig. 13. A dog member 117 provided with a cam surface 118 adapted to engage a cam surface 119 on the cam member 116 is mounted on the stationary housing 9 and resiliently projected into the teeth 120 of the main drum. As the ring 112 is moved forward the cam surface 119 engages the cam surface 118 on the dog and lifts the latter out of the teeth 120 permitting the drum 12 to be indexed as above explained and shown in Fig. 9. The cam surface 118 may then ride over the upper surface 121 of cam member 116 and fall into opening 122 of the cam member 116. As ring 112 is moved backward and the cam surface 118 engages corner 123 of cam member 116 the spring 124 of Fig. 7 permits the cam member to rock and allows the dog 117 to freely pass by the cam member 116 and fall into another tooth 120 in the drum 12 thereby locking the drum again. The parts are so arranged that the above described indexing occurs during the interval when the shaft 100 and cam 75 are stationary. In other words, cam 75 of Fig. 5 actuates the ejector, recapping and suction means while dog 111 is moving between surfaces 114 and 113.

Figure 16:
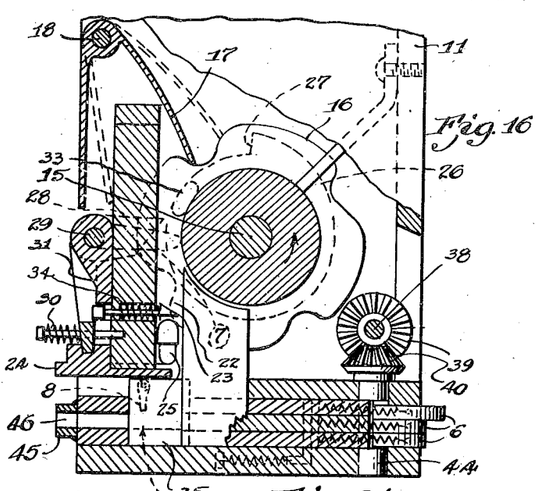
Fig. 16 is a vertical section of the device of Fig. 15.

In the operation of the device the motor 80 drives the metering means and righting means in capsule hopper 11 continuously and rotates blades 67 of the medicine hopper 13 continuously. Capsules are metered by the alternate reciprocation of plungers 23 and plate 24 (Fig. 16). The capsules fall between plates 35 and are contacted by fingers 5 of plates 41, 42, and 43 to turn them between plates 35 and place them in channels 46 of housing 45 with the body ends nearest drum 12. Suction cup 57 is forced behind holes 53 in capsule body carrier 50 by spring 110. The capsules are drawn by the suction into the capsule body aligned holes 52 and 53 in the capsule cap carriers 51 and capsule body carrier 50. The capsules attain sufficient speed and momentum in their travel through channels 46 to be decapped by the inertia of the capsule body when the capsule cap is stopped by shoulder 54 between holes 52 and 53. Cam 75 retracts the suction cup 57. The drum 12 is indexed to present another row of holes in alignment with channels 46. As the drum is indexed periodically to rotate it with a step by step movement the capsule cap carriers 51 are moved axially of the capsule body carriers 50 by cam 62 as the individual capsule cap carriers 51 approach medicine hopper 13 (see Fig. 11). The exposed capsule body is then moved under the hopper 13 and filled with medicine. As the drum is further indexed the cam 63 moves capsule cap carriers 51 back over capsule body carrier 50 until the holes 52 and 53 are again in alignment. Cam 75 actuates a set of plungers 76 which enter holes 53. Block 77 retains the cap in position and the plungers force the capsule body into the capsule cap. As the drum is indexed further the capped and filled capsules are positioned in alignment with plungers 79. Cam 75 actuates plungers 79 which eject the filled capsules into chute 80 leading to hopper 14.

The holes 52 and 53 are radially spaced around drum 12 and are arranged in parallel axial rows whereby the capsules are handled in groups. Each group may be of any number of capsules although the drawings illustrate a device adapted to handle four capsules in each group. The various operations are performed simultaneously on different groups of capsules. Cam 75 releases the suction means to be actuated by spring 110 and actuates the recapping means and ejector during the interval between indexing steps of the drum 12.

I claim:

1. In a capsule filling machine a cylindrical capsule body carrier provided with longitudinal rows of radial holes about its periphery, said holes being adapted to receive capsule bodies, a plurality of arcuate plates slidably mounted for axial movement on the periphery of said carrier, said arcuate plates having longitudinal rows of radial holes adapted to be aligned with the holes in said carrier and receive capsule caps, an arcuate cam track, means on each of said arcuate plates to engage said cam track, means to rotate said cylindrical carrier and plates whereby said arcuate plates are axially reciprocated on said cylindrical carrier to temporarily expose said capsule bodies for filling.

2. In a capsule filling machine a hollow cylindrical capsule body carrier provided with longitudinal rows of radial holes extending through said carrier about its periphery, said holes being adapted to receive capsule bodies, a plurality of arcuate plates slidably mounted for axial movement on the periphery of said carrier, said arcuate plates having longitudinal rows of radial holes adapted to be aligned with the holes in said carrier and receive capsule caps, an arcuate cam track, means on each of said arcuate plates to engage said cam track, means to rotate said cylindrical carrier and plates whereby said arcuate plates are axially reciprocated on said cylindrical carrier to temporarily expose said capsule bodies, means to fill said capsule bodies while temporarily exposed, means to recap said capsules when the holes in said plates are realigned with the holes in said carrier, and means to eject said capsules from said carrier and plates.

3. In a capsule filling machine a cylindrical capsule body carrier provided with longitudinal rows of radial holes about its periphery, said holes being adapted to receive capsule bodies, a plurality of arcuate plates slidably mounted for axial movement on the periphery of said carrier, said arcuate plates having longitudinal rows of radial holes adapted to be aligned with the holes in said carrier and receive capsule caps, means to rotate said carrier and plates, means to axially slide each of said plates in one direction and disalign said capsule caps and bodies to expose a row of capsule bodies as the individual plate rotates through a predetermined position, means to axially slide each of said plates in a second direction and realign said capsule caps and bodies as the individual plate rotates through a second predetermined position whereby at any one instant as the carrier and plates are rotated some of said plates are disaligned and some are aligned, means to separate capsule bodies and capsule caps, means to place capsule bodies in a row of holes in the capsule body carrier and means to place capsule caps in the aligned row of holes in an arcuate plate, means to fill a row of said capsule bodies while said plates are temporarily disaligned, means to recap a row of said capsules when the holes in said plates are realigned with the holes in said capsule carrier and means to eject a row of said capsules whereby rows of capsules are simultaneously subjected to each operation.

4. In a capsule filling device, a pair of concentric cylindrical members with normally aligned apertures adapted to serve as body and cap retaining member respectively, means to unjoin a capsule and place its body in one of said apertures and its cap in the aligned aperture, means to cause relative axial movement of said members whereby said open capsule bodies are exposed, and means to fill said capsule bodies while exposed comprising a material holding chamber open to a portion of the apertured surface of said body retaining member, and means in said chamber to agitate material therein and adapted to pass over and simultaneously press material into the capsule bodies and wipe the surface of said body retaining member.

5. In a capsule handling device to be continuously operated, a first cylindrical carrier provided with recesses having longitudinal axes extending radially of the cylindrical carrier to receive capsule bodies, a second carrier provided with recesses to be aligned with those of the first to receive capsule caps, means to position said carriers to align said recesses, means to forcibly project empty capsules in said recesses to cause decapping of the same, means to cause relative reciprocation between said first and second carriers to expose the open end of said capsule bodies, a source of material, and means to fill said capsule bodies while exposed comprising a material holding chamber open to a portion of the apertured surface of said first cylindrical carrier, and means in said chamber to agitate material therein and adapted to pass over and simultaneously press material into the capsule bodies and wipe the surface of said first cylindrical carrier.

6. In a capsule handling device to be continuously operated, a first cylindrical carrier provided with recesses having longitudinal axes extending radially of the cylindrical carrier to receive capsule bodies, a second carrier provided with recesses to be aligned with those of the first to receive capsule caps, means to position said carriers to align said recesses, means to forcibly project empty capsules in said recesses to cause decapping of the same, means to cause relative reciprocation between said first and second carriers to expose the open end of said capsule bodies, a source of material, means to fill said capsule bodies with said material while exposed, and means to recap said capsules when the recesses of said first and second carriers are realigned.

7. In a capsule handling device to be continuously operated, the combination of a cylindrical capsule body carrier, a plurality of capsule cap carriers comprising arcuate plates spaced about the periphery of said capsule body carrier, said carriers having a first and second set of holes having longitudinal axes extending radially of the carriers and spaced about their peripheries respectively, means to feed capsule bodies and capsule caps into said first and second set of holes, and means to temporarily displace some of said capsule cap carriers thereby exposing a portion of said capsule body carrier for loading of said capsules and to realign said carriers and recesses to permit recapping.

RALPH W. SMITH.